United States Patent
Kobayashi et al.

(10) Patent No.: US 7,532,554 B2
(45) Date of Patent: May 12, 2009

(54) METHOD FOR RECORDING INFORMATION ON OPTICAL RECORDING MEDIUM AND INFORMATION RECORDING APPARATUS

(75) Inventors: Tatsuhiro Kobayashi, Tokyo (JP); Koji Mishima, Tokyo (JP)

(73) Assignee: TDK Corporation, Tokyo (JP)

( * ) Notice: Subject to any disclaimer, the term of this patent is extended or adjusted under 35 U.S.C. 154(b) by 438 days.

(21) Appl. No.: 11/049,689

(22) Filed: Feb. 4, 2005

(65) Prior Publication Data

US 2005/0207308 A1  Sep. 22, 2005

(30) Foreign Application Priority Data

Feb. 5, 2004  (JP)  ............... 2004-029997

(51) Int. Cl.
*G11B 5/09* (2006.01)
*G11B 7/00* (2006.01)

(52) U.S. Cl. .................. 369/59.11; 369/116; 369/59.12

(58) Field of Classification Search ................ 369/59.1, 369/59.11, 59.12, 59.14, 59.17, 59.18, 100, 369/47.5, 53.26, 116

See application file for complete search history.

(56) References Cited

U.S. PATENT DOCUMENTS

| | | | | |
|---|---|---|---|---|
| 5,561,656 A | * | 10/1996 | Hurst, Jr. | 369/59.12 |
| 6,246,659 B1 | * | 6/2001 | Suzuki et al. | 369/116 |
| 6,687,208 B2 | * | 2/2004 | Asada et al. | 369/59.11 |
| 2004/0081052 A1 | * | 4/2004 | Miyamoto et al. | 369/59.11 |
| 2005/0058047 A1 | * | 3/2005 | Fujita et al. | 369/59.11 |
| 2005/0243676 A1 | * | 11/2005 | Kato et al. | 369/59.11 |
| 2005/0243677 A1 | * | 11/2005 | Kobayashi et al. | 369/59.11 |

FOREIGN PATENT DOCUMENTS

| | | |
|---|---|---|
| JP | 10-241164 | 9/1998 |
| JP | 2000-222731 | 8/2000 |
| JP | 2003-30833 | 1/2003 |
| JP | 2003-203383 | 7/2003 |

OTHER PUBLICATIONS

U.S. Appl. No. 11/049,689, filed Feb. 4, 2005, Kobayashi et al.
U.S. Appl. No. 11/054,411, filed Feb. 10, 2005, Kobayashi et al.

* cited by examiner

*Primary Examiner*—Wayne R Young
*Assistant Examiner*—Dionne H Pendleton
(74) *Attorney, Agent, or Firm*—Oblon, Spivak, McClelland, Maier & Neustadt, P.C.

(57) ABSTRACT

When a space region shorter than the radius of a beam spot is formed, pre-heating with an assist pulse is not performed, and an off pulse pattern is fixed at a base power level. When a space region longer than the radius of the beam spot and shorter than the diameter of the beam spot is formed, an assist pulse is applied to the end of the space region to be formed. The length of the assist pulse is made greater, the longer the space region to be formed. Further, when a space region longer than the diameter of the beam spot is formed, an assist pulse is applied to the end of the space region to be formed, and the length of the assist pulse is kept constant regardless of the length of the space region to be formed.

4 Claims, 5 Drawing Sheets

METHOD FOR RECORDING INFORMATION ON OPTICAL RECORDING MEDIUM AND INFORMATION RECORDING APPARATUS

BACKGROUND OF THE INVENTION

The present invention relates to a method of recording information on an optical recording medium and, particularly, to a method of recording information on a write-once type optical recording medium. The invention also relates to an information recording apparatus for recording information on an optical recording medium and, particularly, to an information recording apparatus for recording information on a write-once type optical recording medium.

Recently, proposals have been made on next-generation optical media having a recording capacity much greater than that of media in the related art and allowing a very high data transfer rate to be achieved, and some of such media have already been put in practical use (see Patent Document 1). Unlike optical recording media in the related art, recording and reproduction of data in and from such a next-generation optical media is performed using a laser beam having a wavelength of about 405 nm and an objective lens having a numerical aperture of about 0.85. As a result, the diameter of a laser beam spot on a recording surface is as small as about 0.39 μm, and it is therefore possible to achieve a recording capacity of about 25 GB/side and a data transfer rate of about 36 Mbps at a reference line speed.

Proposed next-generation optical recording media are similar to existing optical recording media such as CDs (compact discs) and DVDs (digital versatile discs) in that they include various types of optical recording media such as reproduction-only types, write-once types, and rewritable types. It is known that a greater amount of heat per unit time is required to record data in write-once type media as recording line speed increases. In order to increase the amount of heat per unit time, it is necessary to use a semiconductor laser having greater power or to increase the length of an on pulse pattern, i.e., to increase the time during which the intensity of a laser beam is set at a recording power level.

Patent Document 1: JP-A-2003-203383

However, a laser beam used for next-generation optical recording media is light in the wave range of blue, and a semiconductor laser capable of emitting such a laser beam at high power is very expensive. If the laser beam is set at the recording power level for a too long time, unwanted accumulation of heat occurs in a recording layer when a long recording mark is formed, and resultant thermal interference causes the problem of degradation of recording characteristics.

One effective solution to such problems is to perform pre-heating by applying an assist pulse having a lower intensity when intervals between recording marks or space regions are formed. However, when the assist pulse is uniformly applied regardless of the lengths of the space regions to be formed, another problem arises in that the pulse application is too long for a recording mark preceded by a short space region and is conversely too short for a recording mark preceded by a long space region.

SUMMARY OF THE INVENTION

Therefore, it is an object of the invention to provide a method of recording information on a write-once type optical recording medium, which is suitable for data recording at a high line speed.

It is another object of the invention to provide an information recording apparatus for recording information on a write-once type optical recording medium, which can record data at a high line speed.

According to the invention, a method of recording information on a write-once type optical recording medium having at least one recording layer on a substrate by irradiating it with a laser beam modulated according to pulse train patterns including at least a recording power level, a base power level, and a medium power level that is in the middle of those power levels to form a recording mark on the recording layer, in that the pulse train patterns include at least each of an on pulse pattern in which a transition occurs from the base power level or medium power level to the recording power level and another transition occurs from the recording power level to the base power level and an off pulse pattern which includes a base power level that follows the on pulse pattern and in that the off pulse pattern is fixed at the base power level when a space region formed between two recording marks is shorter than a first length and the off pulse pattern is changed at a trailing edge thereof from the base power level to the medium power level when the space region is longer than the first length.

According to the invention, an information recording apparatus for recording information on a write-once type optical recording medium having at least one recording layer on a substrate by irradiating it with a laser beam modulated according to pulse train patterns including at least a recording power level, a base power level, and a medium power level that is in the middle of those power levels to form a recording mark on the recording layer, in that the pulse train patterns include at least each of an on pulse pattern in which a transition occurs from the base power level or medium power level to the recording power level and another transition occurs from the recording power level to the base power level and an off pulse pattern which includes a base power level that follows the on pulse pattern and in that the off pulse pattern is fixed at the base power level when a space region formed between two recording marks is shorter than a first length and the off pulse pattern is changed at a trailing edge thereof from the base power level to the medium power level when the space region is longer than the first length.

As thus described, according to the invention, since the intensity of a laser beam is fixed at the base power level when a short space region is formed, no over-heating occurs when a recording mark is formed immediately after a short space region. Further, when a long space region is formed, since the off pulse pattern changes from the base power level to the medium power level at the trailing edge thereof to perform pre-heating, no under-heating occurs when a recording mark is formed immediately after the long space region. As a result, a recording mark can be formed with a proper length regardless of the length of a space region that directly precedes the mark.

According to the invention, the first length is preferably a length given by $0.82 \times \lambda/(2 \times NA)$ where $\lambda$ represents the wavelength of the laser beam and NA represents the numerical aperture of an objective lens for converging the laser beam. The length given by $0.82 \times \lambda/(2 \times NA)$ is equivalent to the radius of the beam spot of a laser beam. In the case of a space region shorter than the radius of a beam spot, the region where the next recording mark is to be formed is irradiated by the beam spot which has been intended for the formation of the preceding recording mark, which increases the possibility of over-heating.

According to the invention, when a space region longer than the first length and shorter than a second length is to be formed, the period during which the pulse train pattern is set at the medium power level is preferably made longer, the greater the length of the space region to be formed. This is an arrangement in consideration of the fact that the length of a space region has a significant influence on the degree of under-heating, and it is possible to perform optimum pre-heating in accordance with the length of a space region.

According to the invention, when space regions longer than the second length are to be formed, the period during which the pulse train pattern is set at the medium power level is preferably made constant regardless of the lengths of the space regions. The reason is that the degree of under-heating is substantially constant regardless of the lengths of apace regions to be formed when the lengths of the space regions are sufficiently great.

According to the invention, the second length is preferably a length given by $0.82 \times \lambda/NA$ where $\lambda$ represents the wavelength of the laser beam and NA represents the numerical aperture of the objective lens for converging the laser beam. The reason is that the length given by $0.82 \times \lambda/NA$) is equivalent to the diameter of the beam spot of a laser beam and that the degree of under-heating is substantially constant regardless of the lengths of space regions when the space regions are longer than the diameter of the beam spot.

According to the invention, a condition expressed by $\lambda/NA \leq 640$ nm is preferably satisfied where $\lambda$ represents the wavelength of the laser beam and NA represents the numerical aperture of the objective lens for converging the laser beam. The reason is that a high recording line speed must be set in a system utilizing such an optical system because the system must have a very high data transfer rate.

As thus described, according to the invention, no over-heating occurs during the formation of a recording mark when a space region preceding the mark is short, and under-heating is prevented during the formation of a recording mark when a space region preceding the mark is short. It is therefore possible to form a recording mark with a proper length regardless of the length of a space region preceding the mark.

Therefore, the invention makes it possible to obtain high signal characteristics even when data are recorded at a high line speed.

BRIEF DESCRIPTION OF THE DRAWINGS

FIG. 1A is a partially cutaway perspective view of the medium, and FIG. 1B is an enlarged partial sectional view of the region A shown in FIG. 1A.

FIGS. 2A, 2B, and 2C show the case of a space region shorter than the radius of the beam spot, the case of a space region longer than the radius of the beam spot and shorter than the diameter of the same, and the case of a space region longer than the diameter of the beam spot, respectively.

DETAILED DESCRIPTION OF THE INVENTION

A preferred mode for carrying out the invention will now be described in detail with reference to the drawings.

Figure 1A:
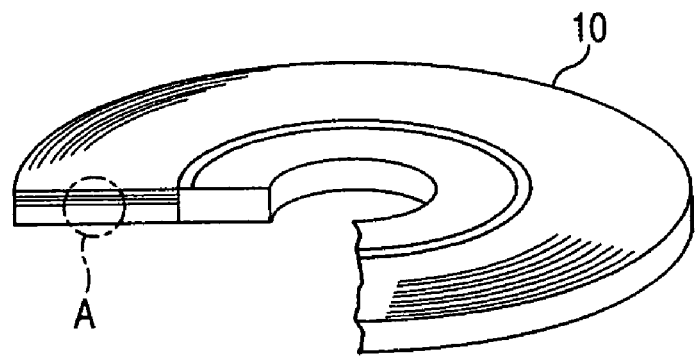
FIGS. 1A and 1B show a structure of an optical recording medium 1 in a preferred mode of carrying out the invention.
Figure 1B:
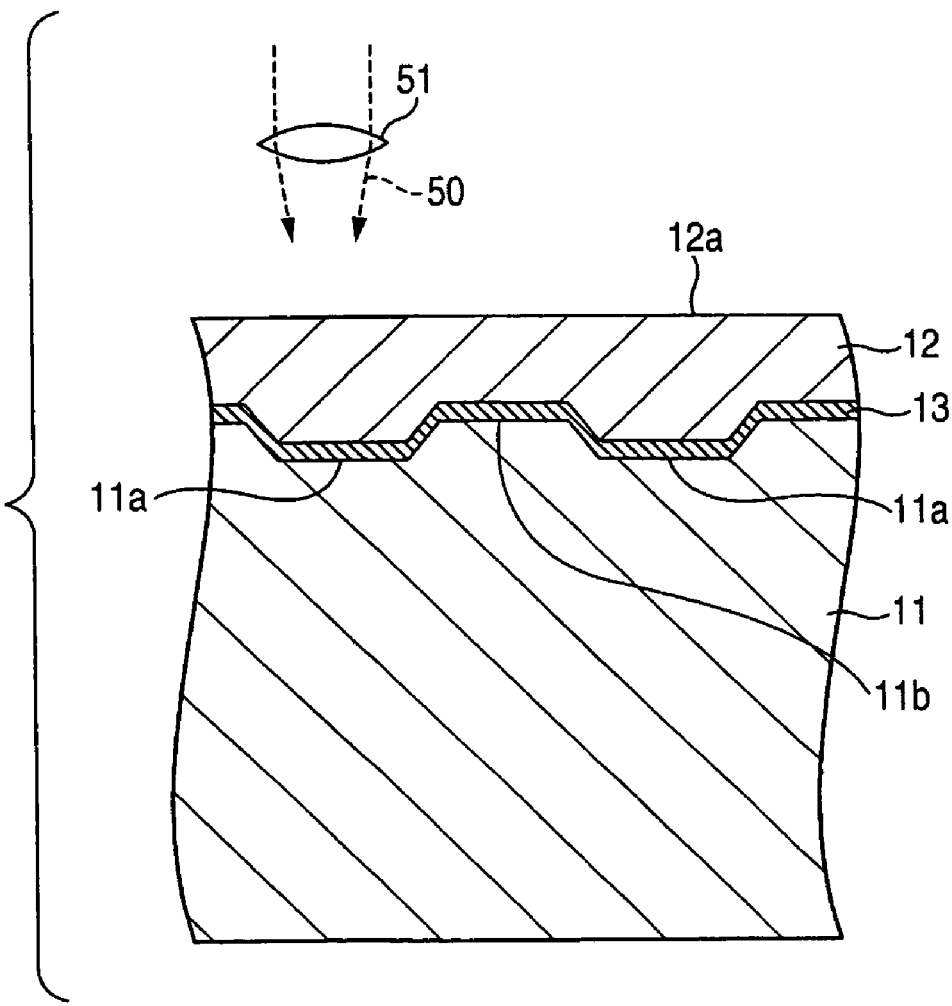

FIG. 1A is a partially cutaway perspective view of an optical recording medium 10 in a preferred mode for carrying out the invention showing the appearance of the same. FIG. 1B is an enlarged partial sectional view of the region A shown in FIG. 1A.

As shown in FIG. 1A, the optical recording medium 10 in the present mode for carrying out the invention is a disc-shaped optical recording medium having an outer diameter of about 120 mm and a thickness of about 1.2 mm, and it has a base substrate 11, a light-transmitting layer 12, and a recording layer 13 provided between the base substrate 11 and the light-transmitting layer 12. The optical recording medium 10 in the present mode for carrying out the invention is a write-once type optical recording medium on which recording and reproduction of data can be performed by irradiating it with a laser beam 50 having a wavelength $\lambda$ in the range from 380 nm to 450 nm, and preferably of about 405 nm, the laser beam being radiated on a light-entering surface 12a that is a surface of the light-transmitting layer 12. An objective lens 51 having a numerical aperture of 0.65 or more, and preferably about 0.85 is used to record and reproduce data in and from the optical recording medium 10, and a relationship expressed by $\lambda/NA \leq 640$ nm is thus set where $\lambda$ represents the wavelength of the laser beam 50 and NA represents the numerical aperture of the objective lens 51.

The base substrate 11 is a disc-shaped substrate having a thickness of about 1.1 mm used for providing the optical recording medium 10 with a required thickness (about 1.2 mm). On one side of the substrate, lands 11a and grooves 11b for guiding the laser beam 50 are formed in the form of spirals or concentric circles extending from the neighborhood of the center of the substrate toward the periphery of the same or from the periphery toward the neighborhood of the center. Various materials, e.g., glasses, ceramics, and resins may be used as the material of the base substrate 11. Particularly, resins are preferable from the viewpoint of ease of molding. Such resins include polycarbonate resins, olefin resins, acrylic resins, epoxy resins, polystyrene resins, polyethylene resins, polypropylene resins, silicone resins, fluorine-type resins, ABS resins, and urethane resins. In particular, polycarbonate resins and olefin resins are preferred from the viewpoint of processability. The base substrate 11 is not required to have high light-transmitting properties because it does not constitute an optical path of the laser beam 50.

While the base substrate 11 is preferably fabricated using an injection molding process employing a stamper, it may be fabricated using other processes such as a photopolymer (2P) process.

The light-transmitting layer 12 is a layer which constitutes an optical path of the laser beam 50. The thickness of the layer is preferably set in the range from 10 to 200 μm and, more particularly, it is preferably set at about 100 μm. Although there is no particular limitation on the material of the light-transmitting layer 12 as long as the material has a sufficient light transmittance in the range of the wavelength of the laser beam 50 to be used, it is preferably to use an acryl type or epoxy type ultraviolet-cured resin. The light-transmitting layer 12 may alternatively be formed using a light-transmitting sheet made of a light-transmitting resin and various types of bonding materials or adhesives instead of a film obtained by curing an ultraviolet-cured resin.

The recording layer 13 is a layer which is irradiated with the laser beam 50 to form irreversible recording marks thereon. While various types of materials may be used for the recording layer 13, it is preferable to use a mixture of ZnS and $SiO_2$ or a material obtained adding magnesium and/or aluminum in a dielectric base material whose main component is LaSiON (a mixture of $La_2O_3$, $SiO_2$, and $Si_3N_4$).

When a mixture of ZnS and $SiO_2$ is used as the main component of the dielectric base material constituting the recording layer 13, the molar ratio of ZnS to $SiO_2$ is preferably set in the range from 50:50 to 90:10, and it is most preferably set at about 80:20. When LaSiON is used as the main component of the dielectric base material, the molar ratio of $SiO_2$ to the sum of Si3N4 and $La_2O_3$ is preferably set in the range from 10:90 to 50:50. When a material is referred to as "main component" in this context, what is meant is that the percentage of the material (a mixture of ZnS and $SiO_2$ or LaSiON) in the dielectric base material is 50 atomic percent or more, and the material preferably occupies 80 atomic percent or more. The amount of magnesium and/or aluminum added to the dielectric base material is preferably set in the range from 18 to 55 atomic percent. The amount is more preferably set in the range from 20 to 35 atomic percent and most preferably set at about 25 atomic percent.

The optical recording medium 10 in the present mode for carrying out the invention has the structure described above in which recording marks can be formed on the recording layer 13 by irradiating the layer with the laser beam 50 that is intensity-modulated from the side of the light-entering surface 12a. The length of each recording mark and the length of each gap (space) between recording marks (or edge gap) are set at a multiple of T which represents cycle time of a clock frequency. That is, the length is set at nT (n is an integer). For example, when the (1,7) RLL modulation method is employed, the lengths of recording marks and spaces are set at any of 2T to 8T.

In order to perform recording at a high line speed in such an optical recording medium 10, the length of an on pulse pattern or the intensity of the laser beam 50 must be set at a recording power level Pw for a long time. However, when an on pulse pattern is too long, a problem arises in that recording characteristics are degraded by thermal interference. Specifically, heat of the laser beam 50 can hardly be diffused in the optical recording medium 10 in the present mode for carrying out the invention which has no reflecting layer as shown in FIG. 1B, and the accumulation of heat is therefore very likely to occur in the same. Under the circumstance, as already described, it is effective to perform pre-heating when space regions are formed by applying an assist pulse having a low intensity. However, when the assist pulse is applied uniformly regardless of the lengths of the space regions to be formed, the pulse application will be too long for a recording mark that is preceded by a short space region and too short for a recording mark preceded by a long space region.

Such a phenomenon will be understood from the following description.

Figure 2A:
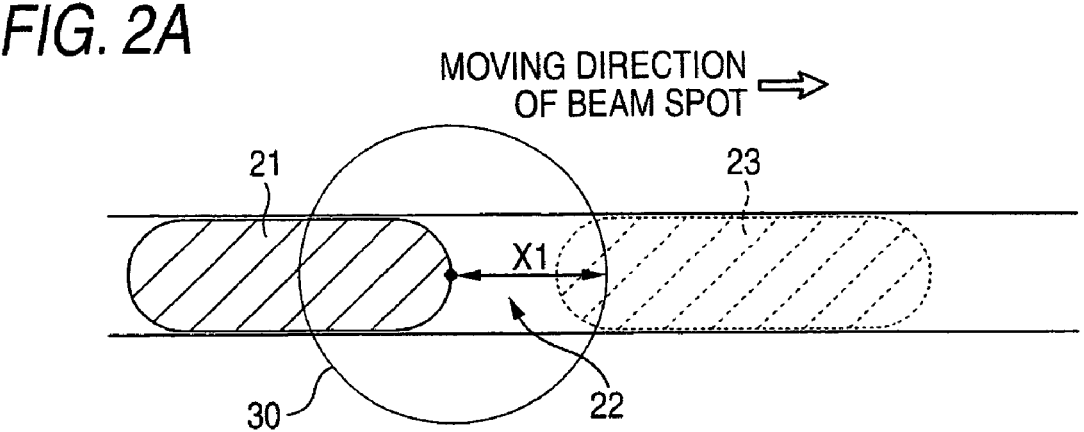
FIGS. 2A, 2B, and 2C are illustrations for explaining a relationship between the length of a space region and the beam spot of a laser beam.
Figure 2B:
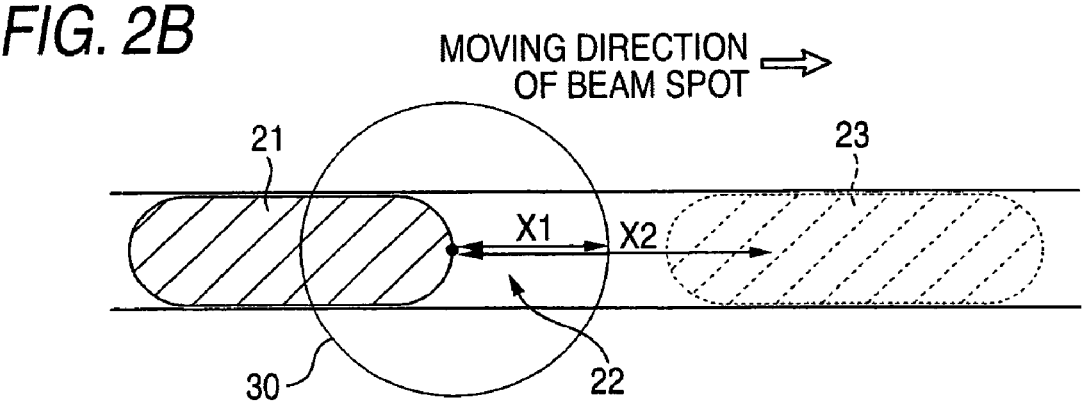
Figure 2C:
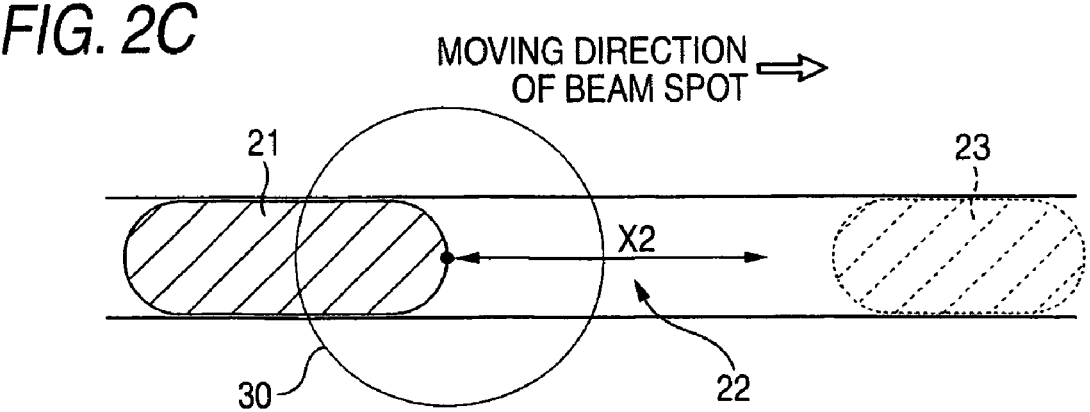

FIGS. 2A to 2C are illustrations for explaining a relationship between the length of a spacer region and the beam spot of a laser beam. FIG. 2A shows the case of a space region shorter than the radius of the beam spot. FIG. 2B shows the case of a space region longer than the radius of the beam spot and shorter than the diameter of the spot. FIG. 2C shows the case of a space region longer than the diameter of the beam spot. The radius of the beam spot is given by $0.82 \times \lambda/(2 \times NA)$, and the diameter of the beam spot is given by $0.82 \times \lambda/NA$. Therefore, the beam spot radius and beam spot diameter are about 195 nm and 391 nm, respectively, when the wavelength of the laser beam 50 ($\lambda$) is 405 nm and the numerical aperture (NA) of the objective lens 51 is 0.85.

First, when a space region 22 is shorter than the radius (represented by X1) of a beam spot 30 as shown in FIG. 2A, a region where a recording mark 23 is to be formed will be irradiated with the beam spot 30 which is radiated to form a recording mark 21 that precedes the mark 23. FIG. 2A shows the position of the beam spot 30 when the formation of the preceding recording mark 21 is completed, and it will be understood that the region where the recording mark 23 is to be formed has already been irradiated with the beam spot 30 at this time. Therefore, there is a possibility of over-heating during the formation of the succeeding recording mark 23 when the space region 22 is shorter than the radius X1 of the beam spot 30. A 2T space (=149 nm) applies to this case when the above-described optical system ($\lambda$=405 nm and NA=0.85) is used and 1T=74.5 nm.

When the space region 22 is longer than the radius X1 of the beam spot 30 as shown in FIG. 2B, the region where the succeeding recording mark 23 is to be formed will not be irradiated with the beam spot 30 which is radiated to form the preceding recording mark 21. In such a case, under-heating can therefore occur during the formation of the succeeding recording mark 23, conversely. In the case shown in FIG. 2B, since the space region 22 is smaller than the diameter (represented by X2) of the beam spot, the distance between the edge of the beam spot 30 and the edge of the recording mark 23 to be formed next is smaller than the radius X1 at the time when the formation of the preceding recording mark 21 is completed. It is assumed that the degree of under-heating significantly depends on the length of the space region 22 when the length of the space region is in such a range. A 3T space (=224 nm), a 4T space (=298 nm), and a 5T space (=373 nm) apply to this case when the above-described optical system ($\lambda$=405 nm and NA=0.85) is used and 1T=74.5 nm.

When the space region 22 is greater than the diameter X2 of the beam spot 30 as shown in FIG. 2C, since the distance between the edge of the beam spot 30 and the edge of the recording mark 23 to be formed next is in the excess of the radius X1 at the time when the formation of the preceding recording mark 21 is completed, it will be assumed that the degree of under-heating is substantially constant regardless of the length of the space region 22. A 6T space (=447 nm), a 7T space (=522 nm), and an 8T space (=596 nm) apply to this case when the above-described optical system ($\lambda$=405 nm and NA=0.85) is used and 1T=74.5 nm.

Taking the above-described fact into consideration, in the present mode for carrying out the invention, pre-heating using an assist pulse is not performed when a space region shorter than the radius X1 of the beam spot 30 is formed (see FIG. 2A), and the off pulse pattern is fixed at a base power level Pb. When a space region longer than the radius X1 of the beam spot 30 is formed (see FIGS. 2B and 2C), pre-heating is performed by applying an assist pulse at the end of the space region to be formed. That is, when a space region longer than the radius X1 of the beam spot 30 is formed, the intensity of the laser beam 50 is changed from the base power level Pb to a medium power level Pm at the trailing edge of the off pulse pattern. Referring to the above described cases by way of example, pre-heating using an assist pulse is performed only when forming space regions having a length of 3T or more. That is, pre-heating using an assist pulse is not performed for a recording mark which can be over-heated when it is formed (e.g., a recording mark succeeding a 2T space), and preheating using an assist pulse is performed for a recording mark which can be under-heated when it is formed (e.g., a recording mark succeeding a space having a length of 3T or more). Thus, it is possible to form a recording mark with a proper length regardless of the length of a space region preceding the same.

When a space region longer than the radius X1 of the beam spot 30 and shorter than the diameter X2 of the beam spot 30 is formed (see FIG. 2B), the length of the assist pulse is preferably made longer, the greater the length of the space region to be formed. That is, it is preferable to set the off pulse pattern at the medium power level for a longer period. This is an arrangement in consideration to the fact that the degree of under-heating significantly depends on the length of the space region to be formed when the space region is in such a range, and it is thus possible to perform optimum pre-heating in accordance with the length of a space region.

When a space region longer than the diameter X2 of the beam spot 30 is formed (see FIG. 2C), the length of the assist pulse is preferably made constant regardless of the space region to be formed. That is, it is preferable to set the off pulse pattern at the middle power range for a constant period. This is an arrangement in consideration to the fact that the degree of under-heating is substantially constant regardless of the space region to be formed when the length of the space region is in such a range, and it is thus possible to perform optimum pre-heating.

A specific description will now be made on a pulse pattern that is preferably used when the above-described optical system ($\lambda$=405 nm and NA=0.85) is used and 1T=74.5 nm.

Figure 3:
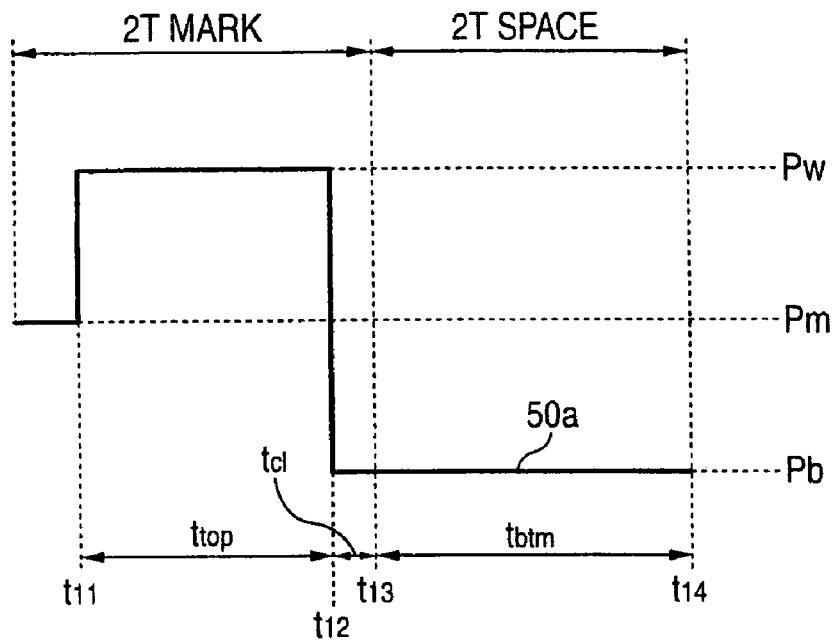
FIG. 3 shows a pulse train pattern for forming a 2T mark and a 2T space.

FIG. 3 shows a pulse pattern for forming a 2T mark and a 2T space.

When a 2T mark is formed as shown in FIG. 3, laser beam intensity 50a is first set at the medium power level Pm and is thereafter changed from the medium power level Pm to the recording power level Pw at a time t11. The intensity is further changed from the recording power level Pw to the base power level Pb at a time t12. Since a change in the intensity of a laser beam takes some transition time, the term "time" of a change in the present specification means a time at which the intensity reaches a value in the middle of the levels of the same before and after the transition.

A period during which the intensity 50a of the laser beam 50 is set at the recording power level Pw is a period during which heat required for the formation of a recording mark is applied, and the term "on pulse pattern" means such a part of a waveform. More specifically, the term means a part of a waveform where the intensity 50a of the laser beam 50 undergoes a transition from the base power level Pb or the medium power level Pm to the recording power level Pw and subsequently undergoes a transition from the recording power level Pw to the base power level Pb. The length of an on pulse pattern is defined as a period from a time at which the intensity 50a of the laser beam 50 reaches a value in the middle of the level before an increase in the same (the base power level Pb or the medium power level Pm) and the level of the same after the increase (the recording power level Pw) until a time at which the intensity reaches a value in the middle of the level before a subsequent decrease in the same (the recording power level Pw) and the level of the same after the decrease (the base power level Pb).

In this case, therefore, the waveform in the period $t_{top}$ from the time t11 until the time t12 is an on pulse pattern. A period during which the laser beam intensity 50a is set at the base power level Pb is a period during which the recording layer 13 is cooled, and a term "cooling pulse" means such a part of a waveform. In this case, the waveform in the period $t_{cl}$ from the time 12 until a time 13 is a cooling pulse. Thus, a 2T mark is formed using one on pulse pattern, i.e., a "solid pattern". Therefore, a sufficient amount of heat per unit time can be maintained to form a recording mark having a preferable shape even when a high recording line speed is to be achieved.

When a 2T space is formed, the laser beam intensity 50a is fixed at the base power level Pb throughout the period of formation, i.e., from the time t13 until a time t14. The reason is that there is no need for pre-heating with an assist pulse because the length of a 2T space is 149 nm which is shorter than the radius X1 (=195 nm) of the beam spot 30. In the present specification, a period during which the laser beam intensity 50a is fixed at the base power level Pb to form a space region is referred to as "period $t_{btm}$".

Figure 4:
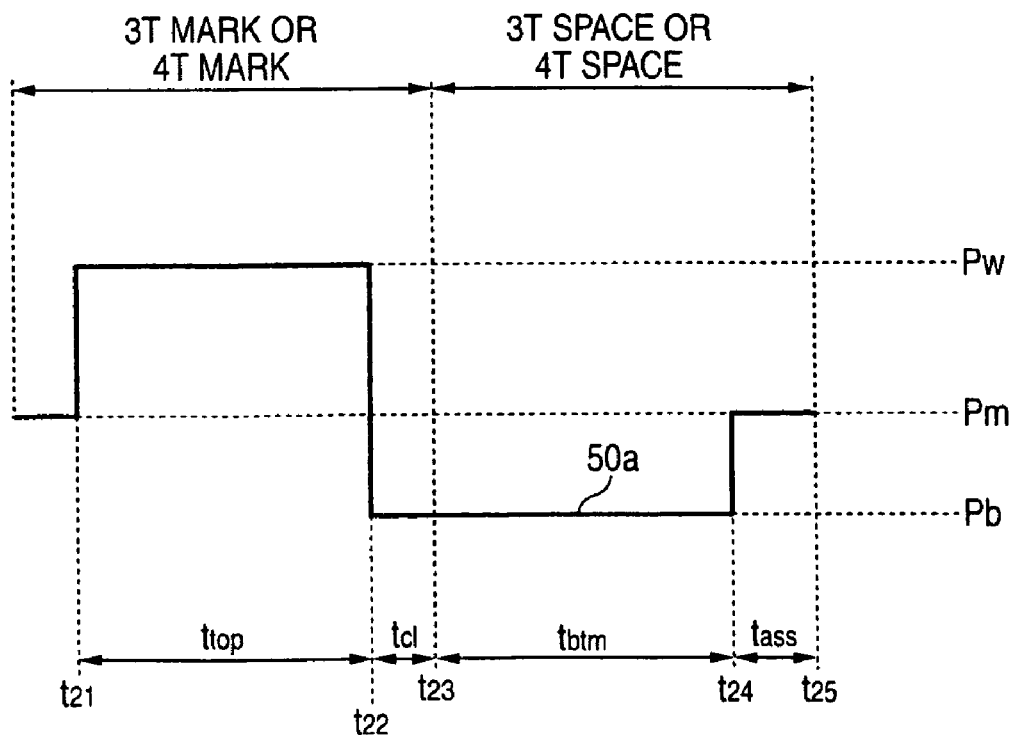
FIG. 4 shows a pulse train pattern for forming a 3T mark and a 3T space or forming a 4T mark and a 4T space.

FIG. 4 shows a pulse pattern for forming a 3T mark and a 3T space or forming a 4T mark and a 4T space.

As shown in FIG. 4, a pulse pattern for forming a 3T mark or a 4T mark is basically the same as that for forming a 2T mark. Specifically, the laser beam intensity 50a is first set at the medium power level Pm and is thereafter changed from the medium power level Pm to the recording power level Pw at a time t21. The intensity is further changed from the recording power level Pw to the base power level Pb at a time t22. Therefore, the waveform in the period $t_{top}$ from the time t21 until the time 22 is an on pulse pattern, and the waveform in the period $T_{cl}$ from the time t22 until a time t23 is a cooling pulse. A 3T mark and a 4T mark are also formed using one on pulse pattern. Therefore, a sufficient amount of heat per unit time can be maintained to form a recording mark having a preferable shape even when a high recording line speed is to be achieved.

When a 3T space or a 4T space is formed, the laser beam intensity 50a is fixed at the base power level Pb until a time t24 and is changed from the base power level Pb to the medium power level Pm at the time t24. A period in which the intensity 50a of the laser beam 50 is thus set at the medium power level Pm when forming a space region is a period for pre-heating in preparation for the formation of a subsequent recording mark, and "an assist pulse" in an off pulse pattern is such a part of the waveform. In this case, therefore, the waveform in the period $t_{ass}$ from the time t24 until a time 25 is an assist pulse.

A relationship expressed by $t_{ass3}<t_{ass4}$ is preferably set where $t_{ass3}$ represents the length of an assist pulse for forming the 3T space, and $t_{ass4}$ represents the length of an assist pulse for forming the 4T space. The reason is that pre-heating is optimized by assisting it in accordance with the lengths of the spaces because the lengths of the 3T space and the 4T space are 224 nm and 298 nm, respectively, which are longer than the radius X1 (=195 nm) of the beam spot 30 and shorter than the diameter X2 (=391 nm) of the beam spot 30.

Figure 5:
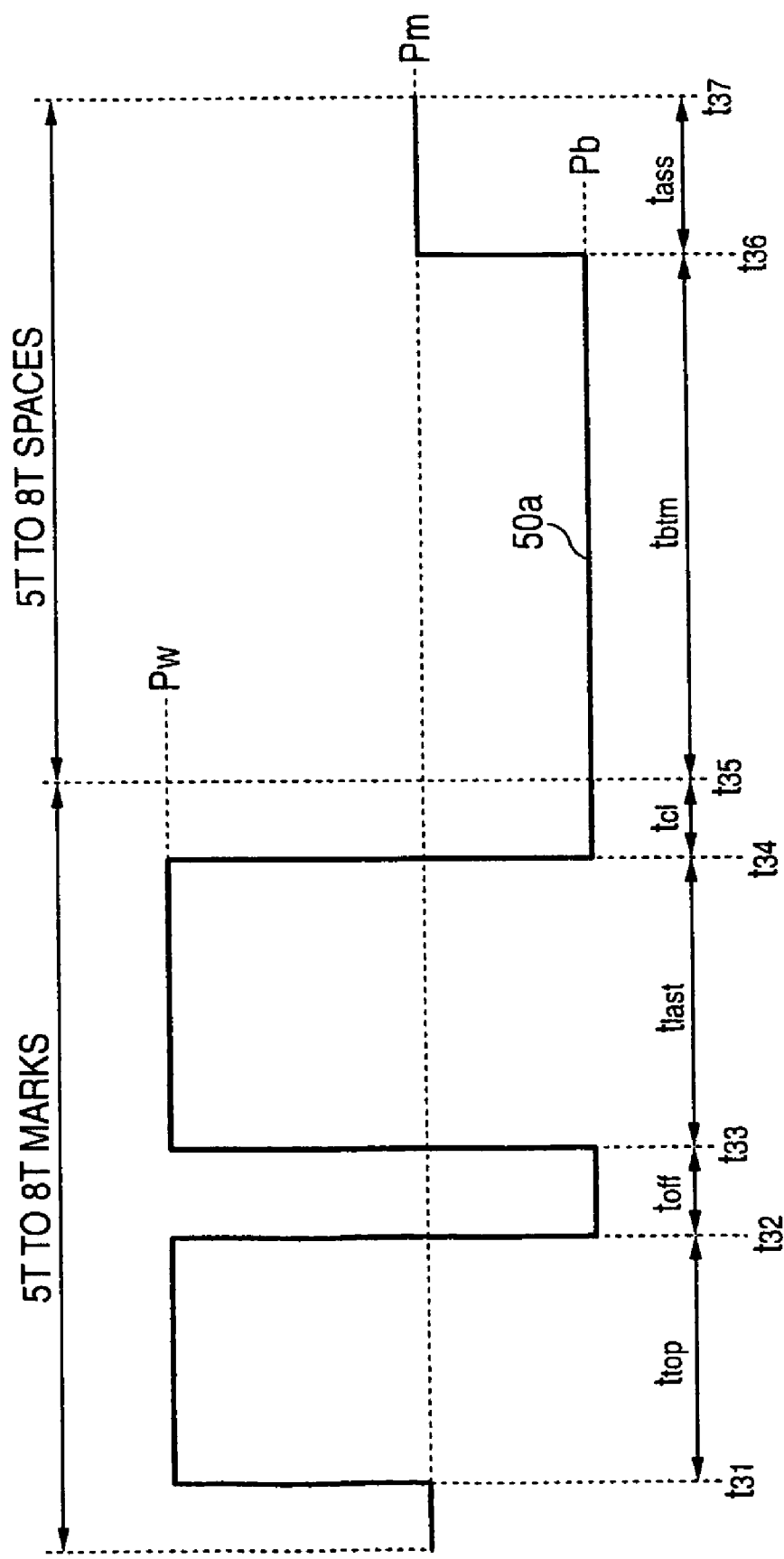
FIG. 5 shows a pulse train pattern for forming 5T to 8T marks, and 5T to 8T marks.

FIG. 5 shows a pulse pattern for forming 5T to 8T marks and 5T to 8T spaces.

As shown in FIG. 5, when 5T to 8T marks are formed, the laser beam intensity 50a is first set at the medium power level Pm and is thereafter changed from the medium power level Pm to the recording power level Pw at a time t31. The intensity is changed from the recording power level Pw to the base power level Pb at a time t32, changed again from the base power level Pb to the recording power level Pw at a time t33, and changed from the recording power level Pw to the base power level Pb at a time t34. In this case, the waveforms in the period $t_{top}$ from the time t31 until the time t32 and the period $T_{last}$ from the time t33 until the time t34 are on pulse patterns. Therefore, there are two on pulse patterns. The period between the on pulse patterns in which the laser beam intensity 50a is set at the base power level Pb is a period in which the recording layer 13 is cooled, and the term "off pulse pattern" means such a part of a waveform. More specifically, the term means a part of a waveform where the intensity 50a of the laser beam 50 undergoes a transition from the recording power level Pw to the base power level Pb and subsequently undergoes a transition from the base power level Pb to the recording power level Pw. The length of an off pulse pattern is defined as a period from a time at which the intensity 50a of the laser beam 50 reaches a value in the middle of the level before a decrease in the same (the recording power level Pw) and the level of the same after the decrease (the base power level Pb) until a time at which the intensity reaches a value in the middle of the level before a subsequent increase in the same (the base power level Pb or the medium power level Pm when a temporary transition to the medium power level Pm occurs) and the level of the same after the increase (recording power level Pw).

That is, the waveform in the period $t_{off}$ from the time t32 until the time t33 is an off pulse. A cooling pulse is constituted by the waveform in the period $t_{cl}$ from the time t34 until a time t35. In the pulse pattern shown in FIG. 5, the length $t_{cl}$ of the cooling pulse is preferably made constant regardless of the length of the recording mark to be formed.

As thus described, when 5T to 8T marks are formed, two on pulse patterns are used, and an off pulse is inserted between the on pulse patterns. Thus, a sufficient amount of heat per unit time can be maintained while suppressing unwanted accumulation of heat in the recording layer, and it is therefore possible to form a recording mark having a preferable shape. When the length $t_{cl}$ of cooling pulses is made constant, the degree of thermal interference to a recording mark to be formed next can be made constant regardless of the type of the recording mark. As a result, a deviation of the length of a space region between a recording mark and a subsequent recording mark is less likely to occur, which makes it possible to mitigate jitters in space regions (space jitters).

When 5T to 8T spaces are formed, the laser beam intensity 50a is fixed at the base power level Pb until a time t36 and is changed from the base power level Pb to the medium power level Pm at the time t36. In this case, therefore, the waveform in the period $t_{ass}$ from the time t36 until a time t37 is an assist pulse.

A relationship expressed by $t_{ass4} < t_{ass5} < t_{ass6} = t_{ass7} = t_{ass8}$ is preferably set where $t_{ass5}$, $t_{ass6}$, $t_{ass7}$, and $t_{ass8}$ represent the lengths of assist pulses for forming the 5T, 6T, 7T, and 8T spaces, respectively. The reason is that pre-heating of the 5T space is optimized by assisting it in accordance with the length of the space in a way similar to the formation of the 3T and 4T spaces because the length of the 5T space is 373 nm which is longer than the radius X1 (=195 nm) of the beam spot 30 and shorter than the diameter X2 (=391 nm) of the beam spot 30. Referring to the 6T, 7T, and 8T spaces, since they have length of 447 mn, 522 nm, and 596 nm, respectively, which are longer than the diameter X2 (=391 nm) of the beam spot 30, pre-heating is optimized by assisting it in a constant manner regardless of the lengths of the spaces.

Specific pulse patterns in the present mode for carrying out the invention are as described above.

Information for identifying such pulse patterns is preferably maintained in the optical recording medium 10 as "recording condition setting information". When such recording condition setting information is maintained in the optical recording medium 10, the recording condition setting information is read by an information recording apparatus when a user actually attempts recording of data, and a pulse pattern can be determined based on the information.

More preferably, the recording condition setting information includes not only pulse patterns but also information required for identifying various conditions (a recording line speed and so on) to be met to record data in the optical recording medium 10. The recording condition setting information may be recorded as wobbles or pits, and the information may alternatively be recorded as data in the recording layer 13. Instead of directly indicating the conditions to be met for data recording, a pulse pattern may be indirectly identified by specifying any of various conditions stored in an information recording apparatus in advance.

The invention is not limited to the above-described mode for carrying out the invention and may be modified in various ways within the scope of the invention as set forth in the appended claims. It is obvious that such modifications are also included in the scope of the invention.

For example, while the optical recording medium 10 in the above-described mode for carrying out the invention has a configuration in which the recording layer 13 is directly sandwiched by the base substrate 1 and the light-transmitting layer 12, the recording layer 13 may alternatively be physically and chemically protected by providing a dielectric layer on either or both sides of the recording layer 13.

A hard coat layer may be provided on a surface of the light-transmitting layer 12 in order to protect the light-transmitting layer 12 and to prevent it from getting dirty due to finger prints and so on. In this case, a surface of the hard coat layer constitutes a light-entering surface.

EXAMPLE

An example of the invention will now be described, and it should be noted that the invention is not limited to the example in any sense.

[Fabrication of Test Sample]

A test sample identical in structure to the optical recording medium 10 shown in FIG. 1 was fabricated according to the following method.

First, an injection molding process was performed to form a disc-shaped base substrate 11 made of polycarbonate having a thickness of about 1.1 mm and a diameter of about 120 mm and having lands 11a and grooves 11b formed thereon. The depth of the grooves 11b was set at about 21 nm, and the width of the grooves 11b was set at about 169 nm. The track pitch was set at about 320 nm.

Next, the base substrate 11 was set in a sputtering apparatus to perform a sputtering process on the same, whereby a recording layer 13 having a thickness of 36 nm was formed on the side of the substrate having the lands 11a and the grooves 11b formed thereon using both of a mixed target of ZnS and $SiO_2$ (at a molar ratio of 80:20) and a target constituted by magnesium. The recording layer 13 included 22.6% Zn, 9.3% Si, 25.0% Mg, 18.6% O, and 24.5% S in terms of atomic percentage.

The recording layer 13 was then coated with an acryl type ultraviolet-cured resin using a spin coat process and was irradiated with ultraviolet light to form a light-transmitting layer 12 having a thickness of about 100 μm. A plurality of the test samples was fabricated in such a manner.

[Characteristics Evaluation 1]

The test samples fabricated were set in an optical disc evaluation apparatus (optical disc evaluation apparatus DDU-1000 manufactured by Pulstec Industrial Co., Ltd.) to irradiate the recording surface 13 through a light-transmitting surface 12a with a laser beam having a wavelength of about 405 nm radiated through an objective lens having a numerical aperture of about 0.85 while rotating the samples at a line speed of about 19.7 m/s. Thus, (1, 7) RLL mixed signals (2T to 8T) were recorded.

Referring pulse patterns, the pulse pattern shown in FIG. 3 was used to form 2T marks and 2T spaces; the pulse pattern shown in FIG. 4 was used to form 3T and 4T marks and 3T and 4T spaces; and the pulse pattern shown in FIG. 5 was used to form 5T to 8T marks and 5T to 8T spaces. The recording power level Pw, the medium power level Pm, and the base power level Pb were set at 12.6 mW, 5.0 mW, and 2.5 mW, respectively. The lengths of the periods $t_{top}$, $t_{last}$, $t_{off}$, $t_{cl}$, $t_{btm}$, and $t_{ass}$ were set as shown in Table 1 for each of the recording marks and spaces.

TABLE 1

| Signal | Recording Marks | | | | Spaces | |
|---|---|---|---|---|---|---|
| Length | $t_{top}$ | $t_{off}$ | $t_{last}$ | $t_{cl}$ | $t_{btm}$ | $t_{ass}$ |
| 2T | 1.7T | — | — | 0.1T | 2.0T | — |
| 3T | 2.3T | — | — | 0.4T | 2.3T | 0.7T |
| 4T | 3.1T | — | — | 0.5T | 3.1T | 0.9T |
| 5T | 2.1T | 0.2T | 1.8T | 0.5T | 3.9T | 1.1T |
| 6T | 2.6T | 0.3T | 2.2T | 0.5T | 4.3T | 1.7T |
| 7T | 2.9T | 0.6T | 2.6T | 0.5T | 5.3T | 1.7T |
| 8T | 3.4T | 1.0T | 2.7T | 0.5T | 6.3T | 1.7T |

In the pulse train patterns shown in Table 1, no assist pulse was used form a 2T space, and assist pulses were used to form 3T to 8T spaces. The lengths of the pulses were set to satisfy:

$$t_{ass3} < t_{ass4} < t_{ass5} < t_{ass6} = t_{ass7} = t_{ass8}$$

The recorded signals were reproduced at a line speed of about 4.9 m/s and were subjected to waveform equalization by an equalizer. Thereafter, deviations of the lengths of the recording marks were measured in association with the lengths of the respective preceding spaces using a time interval analyzer TA720 manufactured by Yokogawa Electric Corporation.

Figure 6:
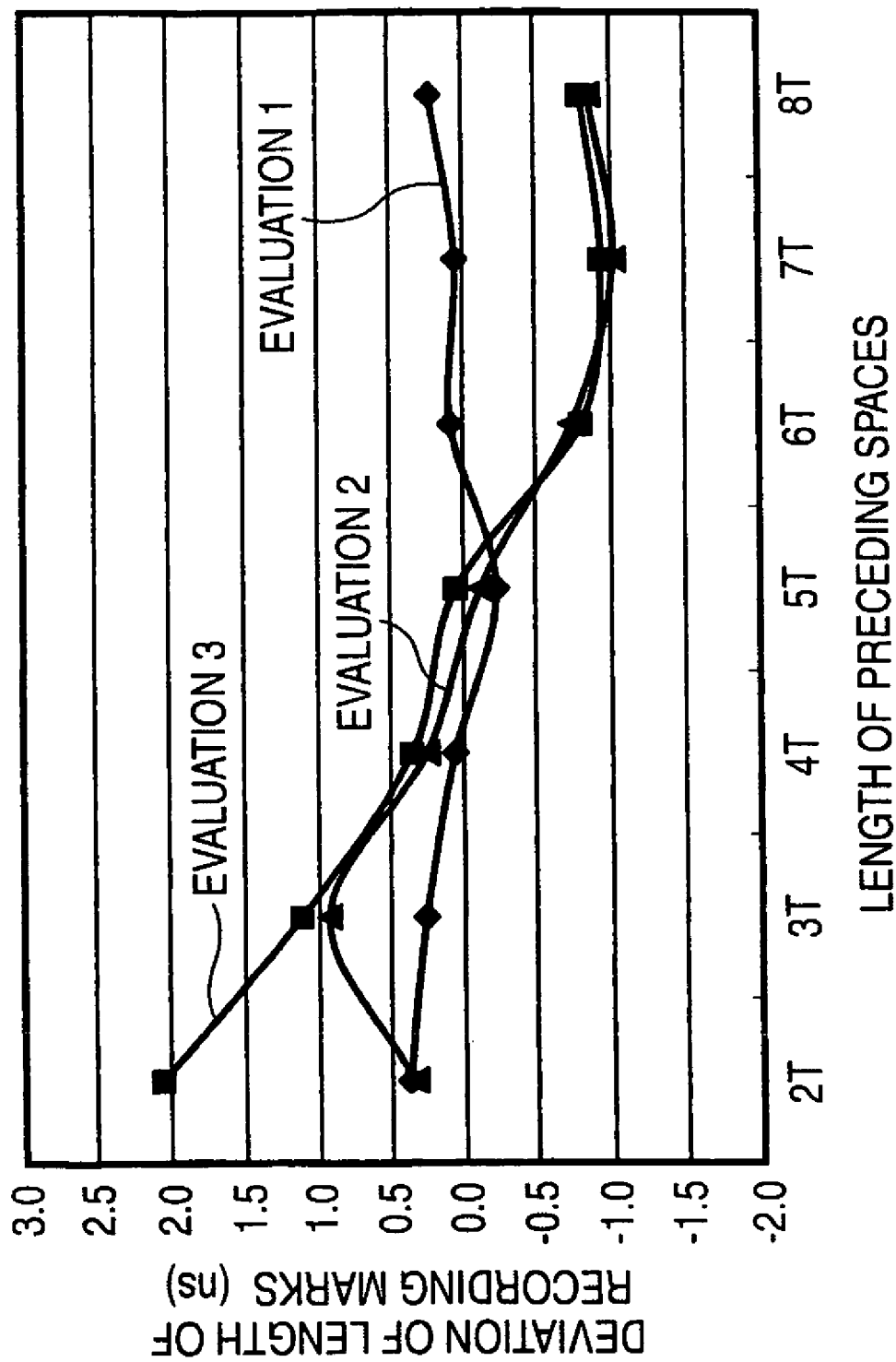
FIG. 6 is a graph showing results of characteristics evaluations 1 and 2.

The results of the measurement are shown in FIG. 6. As shown in FIG. 6, deviations of the lengths of the recording marks were kept as small as about ±0.4 ns regardless of the lengths of the respective preceding spaces when the pulse train patterns shown in Table 1 were used, and no significant correlation was observed between the deviations of the recording mark lengths and the lengths of the preceding spaces.

[Characteristics Evaluation 2]

Evaluation was conducted similarly to the characteristics evaluation 1 except that the lengths of the periods $t_{top}$, $t_{last}$, $t_{off}$, $t_{cl}$, $t_{btm}$, and $t_{ass}$ were set as shown in Table 2.

TABLE 2

| Signal | Recording Marks | | | | Spaces | |
|---|---|---|---|---|---|---|
| Length | $t_{top}$ | $t_{off}$ | $t_{last}$ | $t_{cl}$ | $t_{btm}$ | $t_{ass}$ |
| 2T | 1.7T | — | — | 0.1T | 2.0T | — |
| 3T | 2.3T | — | — | 0.4T | 2.0T | 1.0T |
| 4T | 3.1T | — | — | 0.5T | 3.0T | 1.0T |
| 5T | 2.1T | 0.2T | 1.8T | 0.5T | 4.0T | 1.0T |
| 6T | 2.6T | 0.3T | 2.2T | 0.5T | 5.0T | 1.0T |
| 7T | 2.9T | 0.6T | 2.6T | 0.5T | 6.0T | 1.0T |
| 8T | 3.4T | 1.0T | 2.7T | 0.5T | 7.0T | 1.0T |

In the pulse train patterns shown in Table 2, no assist pulse was used form a 2T space, and the assist pulses used to form 3T to 8T spaces had a constant length (=1.0T).

The results of the evaluation are also shown in FIG. 6. As shown in FIG. 6, when the length of the assist pulses used forming 3T to 8T spaces was made constant, there was a tendency that a recording mark preceded by a short space region had a greater length and that a recording mark preceded by a long space region had a smaller length. However, deviations of the recording mark lengths were kept as small as about ±1.0 ns.

[Characteristics Evaluation 3]

Evaluation was conducted similarly to the characteristics evaluation 1 except that the lengths of the periods $t_{top}$, $t_{last}$, $t_{off}$, $t_{cl}$, $t_{btm}$, and $t_{ass}$ were set as shown in Table 3.

TABLE 3

| Signal | Recording Marks | | | | Spaces | |
|---|---|---|---|---|---|---|
| Length | $t_{top}$ | $t_{off}$ | $t_{last}$ | $t_{cl}$ | $t_{btm}$ | $t_{ass}$ |
| 2T | 1.7T | — | — | 0.1T | 1.0T | — |
| 3T | 2.3T | — | — | 0.4T | 2.0T | 1.0T |
| 4T | 3.1T | — | — | 0.5T | 3.0T | 1.0T |
| 5T | 2.1T | 0.2T | 1.8T | 0.5T | 4.0T | 1.0T |
| 6T | 2.6T | 0.3T | 2.2T | 0.5T | 5.0T | 1.0T |
| 7T | 2.9T | 0.6T | 2.6T | 0.5T | 6.0T | 1.0T |
| 8T | 3.4T | 1.0T | 2.7T | 0.5T | 7.0T | 1.0T |

In the pulse train patterns shown in Table 3, assist pulses were used to form all of 2T to 8T spaces, and the length of the pulses was made had a constant (=1.0T).

The results of the evaluation are also shown in FIG. 6. As shown in FIG. 6, when assist pulses were used to form all of the spaces, there was a more significant tendency that a recording mark preceded by a short space region had a greater length and that a recording mark preceded by a long space region had a smaller length, and the length of a recording mark was increased by 2 ns or more when it was preceded by a 2T space region.

What is claimed is:

1. A method of recording Run Length Limited Pulse Width Modulated information on a write-once type optical recording medium having at least one recording layer on a substrate, comprising:
    irradiating the at least one recording layer with a laser beam modulated according to pulse train patterns including at least a recording power level, a base power level, and a medium power level that is in the middle of those power levels to form a recording mark on the recording layer, wherein
    the pulse train patterns include an on pulse pattern in which a transition occurs from the base power level or medium power level to the recording power level and another transition occurs from the recording power level to the base power level and an off pulse pattern which includes a base power level that follows the on pulse pattern,
    the off pulse pattern is fixed at the base power level when a space region formed between two recording marks has a length of two clock length 2T and the off pulse pattern is changed at a trailing edge thereof from the base power level to the medium power level when the space region has a length between three clock length 3T and eight clock length 8T, and
    when the space region has a length from six clock length 6T to eight clock length 8T, a period during which the pulse train pattern is set at the medium power level is kept constant regardless of the length of the space region to be formed.

2. A method of recording information according to claim 1, wherein the laser beam is radiated in a condition satisfying λ/NA<640 nm where λ represents the wavelength of the laser beam and NA represents the numerical aperture of the objective lens for converging the laser beam.

3. An information recording apparatus configured to record Run Length Limited Pulse Width Modulated information on a write-once type optical recording medium having at least one recording layer on a substrate, comprising:
   an irradiating unit configured to irradiate the at least one recording layer with a laser beam modulated according to pulse train patterns including at least a recording power level, a base power level, and a medium power level that is in the middle of those power levels to form a recording mark on the recording layer, wherein
   the pulse train patterns include an on pulse pattern in which a transition occurs from the base power level or medium power level to the recording power level and another transition occurs from the recording power level to the base power level and an off pulse pattern which includes a base power level that follows the on pulse pattern,
   the off pulse pattern is fixed at the base power level when a space region formed between two recording marks has a length of two clock length 2T and the off pulse pattern is changed at a trailing edge thereof from the base power level to the medium power level when the space region has a length between three clock length 3T and eight clock length 8T, and
   when the space region has a length from six clock length 6T to eight clock length 8T, a period during which the pulse train pattern is set at the medium power level is kept constant regardless of the length of the space region to be formed.

4. An information recording apparatus according to claim 3, wherein the laser beam is configured to radiate in a condition satisfying $\lambda/NA<640$ nm where $\lambda$ represents the wavelength of the laser beam and NA represents the numerical aperture of the objective lens for converging the laser beam.

* * * * *